United States Patent [19]

Fuller, Jr. et al.

[11] Patent Number: 5,033,071

[45] Date of Patent: Jul. 16, 1991

[54] MATERIAL COMPOSITION ANALYZER AND METHOD

[75] Inventors: Robert L. Fuller, Jr., Issaquah; Paul E. Faville, Renton, both of Wash.

[73] Assignee: The Boeing Company, Seattle, Wash.

[21] Appl. No.: 316,171

[22] Filed: Feb. 24, 1989

[51] Int. Cl.[5] .................... G01N 23/223

[52] U.S. Cl. .................... 378/45; 378/53; 378/58; 378/88

[58] Field of Search .................... 378/44, 45, 51, 53, 378/57, 58, 82, 83, 86, 88

[56] References Cited

U.S. PATENT DOCUMENTS

| | | | |
|---|---|---|---|
| Re. 27,690 | 7/1973 | Roinestad et al. | 198/193 |
| D. 260,506 | 9/1981 | Roinestad | D12/60 |
| 719,751 | 2/1903 | Condon . | |
| 1,090,948 | 3/1914 | Sklovsky et al. . | |
| 1,367,199 | 2/1921 | Miller . | |
| 1,846,327 | 2/1932 | Gray . | |
| 2,186,652 | 1/1940 | Orth et al. | 209/97 |
| 2,464,449 | 3/1949 | Johnston | 209/82 |
| 2,794,551 | 6/1957 | Colling et al. | 209/99 |
| 2,873,854 | 2/1959 | Dapp et al. | 209/88 |
| 2,895,064 | 7/1959 | Hoff et al. | 310/29 |
| 2,982,405 | 5/1961 | Fitz Gerald | 209/90 |
| 2,982,406 | 5/1961 | Fitz Gerald | 209/90 |
| 2,984,350 | 5/1961 | Fitz Gerald | 209/90 |
| 2,997,158 | 8/1961 | Moskowitz et al. | 198/220 |
| 3,052,999 | 9/1962 | Sedgwick et al. | 40/2.2 |
| 3,197,027 | 7/1965 | Sargrove | 209/88 |
| 3,225,898 | 12/1965 | Roinestad | 198/181 |
| 3,225,902 | 12/1965 | Roinestad | 198/202 |
| 3,231,941 | 2/1966 | Flynn, Jr. | 19/106 |
| 3,261,451 | 7/1966 | Roinestad | 198/193 |
| 3,276,570 | 10/1966 | Hale et al. | 198/193 |
| 3,308,856 | 3/1967 | Ploss | 140/71 |
| 3,333,678 | 8/1967 | Rodman | 198/181 |
| 3,348,659 | 10/1967 | Roinestad | 198/136 |
| 3,366,248 | 1/1968 | Sedgwick et al. | 211/1.5 |
| 3,439,795 | 4/1969 | Roinestad et al. | 198/193 |
| 3,467,239 | 9/1969 | Roinestad | 198/195 |
| 3,528,136 | 9/1970 | Bechtel, Jr. et al. | 19/102 |
| 3,682,295 | 8/1982 | Roinestad | 198/203 |
| 3,716,128 | 2/1973 | Edge et al. | 198/38 |
| 3,737,953 | 6/1973 | Bechtel, Jr. | 19/113 |
| 3,743,091 | 7/1973 | Fowlkes | 209/911 |
| 3,743,093 | 7/1973 | Klancnik | 209/911 |
| 3,793,677 | 2/1974 | Bechtel, Jr. | 19/113 |
| 3,794,155 | 2/1974 | Bechtel, Jr. | 198/194 |
| 3,812,965 | 5/1974 | Kurata et al. | 209/74 |
| 3,920,117 | 11/1975 | Roinestad | 198/194 |
| 4,074,392 | 2/1978 | Bechtel, Jr. | 19/113 |
| 4,078,655 | 3/1978 | Roinestad | 198/848 |
| 4,106,628 | 8/1978 | Warkentin et al. | 209/74 M |
| 4,171,051 | 10/1979 | Wullenwaber | 209/542 |
| 4,249,661 | 2/1981 | Lem | 209/564 |
| 4,271,966 | 6/1981 | Crowley | 209/576 |
| 4,383,604 | 5/1983 | Grandemange | 198/775 |
| 4,394,901 | 7/1983 | Roinestad | 198/850 |
| 4,398,318 | 8/1983 | Ashworth, III | 19/114 |
| 4,561,819 | 12/1985 | Wiernicki | 198/345 |
| 4,577,377 | 3/1986 | Light | 378/45 |
| 4,685,557 | 8/1987 | Roinestad | 198/834 |
| 4,692,935 | 9/1987 | Kumakura et al. | 378/45 |
| 4,869,813 | 9/1989 | Bailey et al. | 209/564 |

OTHER PUBLICATIONS

Ashworth Bros., Inc., "An Introduction to Small Radius Omniflex and Small Radius Omni-Grid", Bulletin No. SR80 (Rev. 8/83).

*Primary Examiner*—Craig E. Church
*Attorney, Agent, or Firm*—Delbert J. Barnard

[57] ABSTRACT

Articles (14) are moved downwardly along a slideway (52) which includes a stop gate (50). The stop gate (50) is moved into the slideway (52) to stop the article (14). Then an instrument (44) is moved toward the slideway (52) and the article (14) to place the instrument (44) contiguous the article (14). The instrument irradiates the article (14). This radiation excites the elements in the article (14), causing them to give off their own characteristic x-rays. The energy of the characteristic x-rays identifies the elements and possibly also the element's concentration. Following the analysis the instrument (44) is raised and the stop gate (50) is lowered, allowing the article (14) to move forward along the slideway (52). Drill bits (14) are analyzed in this manner to differentiate between drill bits (14) of different hardness but identical geometric characteristics.

16 Claims, 9 Drawing Sheets

MATERIAL COMPOSITION ANALYZER AND METHOD

TECHNICAL FIELD

This invention relates to automated analysis of articles (e.g. drill bits) as to their material composition More particularly, it relates to a method and apparatus for automatically analyzing a large number of many sizes or types of articles which are moving single file on a conveyor, to determine their material composition.

BACKGROUND OF THE INVENTION

Many manufacturing operations (e.g the manufacture of aircraft) require the drilling of a large number of holes in varying sizes. Drill bits are used until they become dull and then they are resharpened. In a typical aircraft manufacturing plant, it is necessary to resharpen an extremely large number of drill bits each week. By way of example, approximately fifty thousand used drill bits are resharpened each week by The Boeing Company in a facility in Auburn, Wash.

The used drill bits are cleaned and sorted before being resharpened. In the past, the sorting operation has been a manual process requiring a number of people (e.g. eight) to perform rough sorting and final sorting activities. In the manual process, cleaned drill bits are deposited onto a conveyor which moves them past two or three people who manually remove the drill bits from the conveyor and separate them into rough sort categories (e.g. 20–25 categories). The drill bits are then hand carried to final sort areas where additional personnel (e.g. five to six people) manually identify and place the drill bits into species bins. In the aforementioned Auburn facility of The Boeing Company, the drill bits to be sorted comprise over six hundred types or species.

A principal object of the present invention is to provide a method and apparatus for analyzing articles as to their material composition, for use in conjunction with, but not limited to, the sorting of the drill bits.

RELATED APPLICATIONS

The method and apparatus of the present invention may be a part of an automated article sorting system which receives the articles in bulk, sometimes entangled, and automatically separates them and starts them on a path of travel in single file. Basic and specific aspects of systems and methods for automated sorting form the subject matter of copending application Ser. No. 07/270,221, filed Nov. 10, 1988, and entitled "Article Sorting Apparatus and Method" and copending application Ser. No. 07/270,129, filed Nov. 10, 1988, and entitled "Method And Apparatus For Automatically Sorting Drill Bits."

By way of example, the articles can be separated and moved onto a conveyor, in single file, by use of a singulating system which forms the subject matter of a copending companion application Ser. No. 07/270,130, filed Nov. 10, 1988, and entitled "Article Singulating System and Method".

For some articles, the end-to-end orientation of the articles on the conveyor is important. By way of example, it is advantageous that drill bits to be sorted be moved through the sorting system with a common end (e.g. the shank end) leading. It saves wear and tear on hardware and simplifies the software. In such case, it is advantageous to correct the end-to-end orientation of the singulated articles which are not properly oriented when they are placed on the conveyor. Such orientation may be accomplished by use of an orientation system which forms the subject matter of a second copending companion application Ser. No. 07/270,251, filed Nov. 10, 1988, and entitled "Article Orientation System And Method".

It is desirable that the receiving bins or receptacles into which the sorted articles are placed be located close together in an area involving a relatively small amount of floor space. This can be accomplished by positioning the receiving bins side-by-side along a helical path. A receiving bin system of this type forms the subject matter of a third copending companion application Ser. No. 07/269,991, filed Nov. 10, 1988, and entitled "Storage Mechanism For Sorted Articles."

DISCLOSURE OF THE INVENTION

In preferred form, the composition identifying mechanism of the invention is basically characterized by a gravity conveyor which includes a slideway along which articles slide. A stop gate is provided which is movable between a stop position in which it blocks travel of an article along the slideway and a retracted position in which it is clear of the slideway, allowing the article to slide along the slideway. An instrument is provided for generating an identifying indicia based on the material composition of each article. This instrument is mounted above the slideway adjacent the stop gate, for movement between a position contiguous the slideway and a position spaced from the slideway. In operation, each article is stopped in position by the stop gate. Then the instrument is moved toward the slideway to place it contiguous the stopped article. The instrument is then operated to analyze the article as to the presence or absence of a specific element(s) in the material from which the article is constructed.

In accordance with an aspect of the invention, the slideway comprises a base portion and opposite sidewall portions which together define a slideway groove in which the articles slide. The base portion includes a stop gate avenue extending substantially perpendicular to the slideway. A stop gate is located within the stop gate avenue. The base of the slideway may further comprise an avenue for a dislodging pin. The dislodging pin is located in the avenue and is extendible out from the avenue for imparting a movement starting force on an article that has been stopped on the slideway.

The material analyzing instrument may be an x-ray fluorescent analyzer of a type including a wall directed towards the article to be analyzed in which an x-ray slot is provided. The slot is narrow and is positioned to be in alignment with a stopped article on the slideway. The movement of the instrument into a position contiguous the slideway places the slot contiguous the article to be analyzed. Preferably, the instrument housing carries shield walls which project from the instrument housing into positions outwardly adjacent the sidewalls of the slideway. When the instrument is moved into its position contiguous the slideway, the region subjected to x-rays from the instrument is enclosed except for openings into the slideway at the opposite boundaries of the instrument housing in the direction of the slideway. These openings are small and are spaced a substantial distance from the x-ray slot and the downstream opening is substantially closed by the stop gate.

In operation, articles to be analyzed are sent along the slideway in single file. The stop gate is raised to stop an article and then the instrument is lowered to place the x-ray slot contiguous the stopped article. The article is irradiated and this excites the elements in the article material causing them to fluoresce (give off their own characteristic x-rays). The energy of these characteristic x-rays identifies the element. Following identification the instrument is raised and the stop gate is lowered. By use of the mechanism of the invention, each article can be analyzed quickly and then allowed to move on along the slideway to the next station.

The composition identifying mechanism of the present invention was developed as a means for distinguishing between drill bits which are identical in their physical dimension characteristics but different as to hardness based on differences in their element composition. By way of example, one type of drill bit may comprise a certain level of cobalt and another drill bit with the same geometric characteristics does not include the cobalt. The composition identifying mechanism is used to determine the presence or absence of the cobalt and this information is used along with the dimensional characteristics of the drill bit for controlling the routing of the drill bits to storage receptacles in a drill bit sorting system. However, it is to be understood that the mechanism of the invention has a more general use and can be used for identifying the material composition of articles other than drill bits and can be used for determining the presence or absence of many different types of materials. The instrument that is used is also capable of measuring the concentration of an element in an article as a function of the intensity of the characteristic x-rays of an element.

These and other objects, features and advantages of the invention are hereinafter described as a part of the description of the best mode of the invention.

BRIEF DESCRIPTION OF THE DRAWING

Like reference numerals designate like parts throughout the several views of the drawing, and.

BEST MODE FOR CARRYING OUT THE INVENTION

Figure 1:
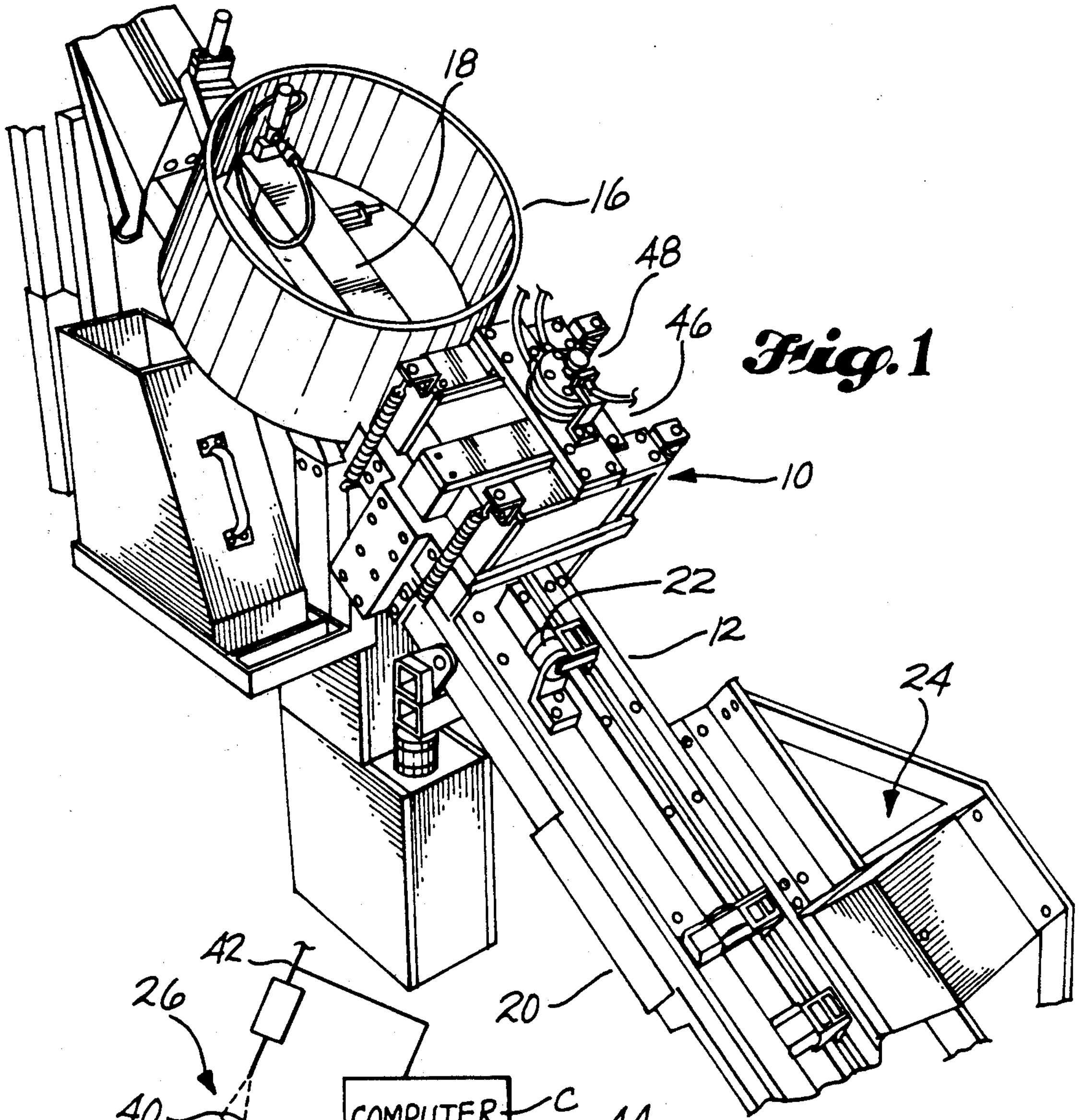
FIG. 1 is a fragmentary isometric view of an embodiment of composition identifying mechanism incorporating the invention, shown by way of typical example as a component of a system for sorting drill bits, such view showing the mechanism mounted above a slideway portion of a gravity conveyor along which the drill bits slide.
Figure 2:
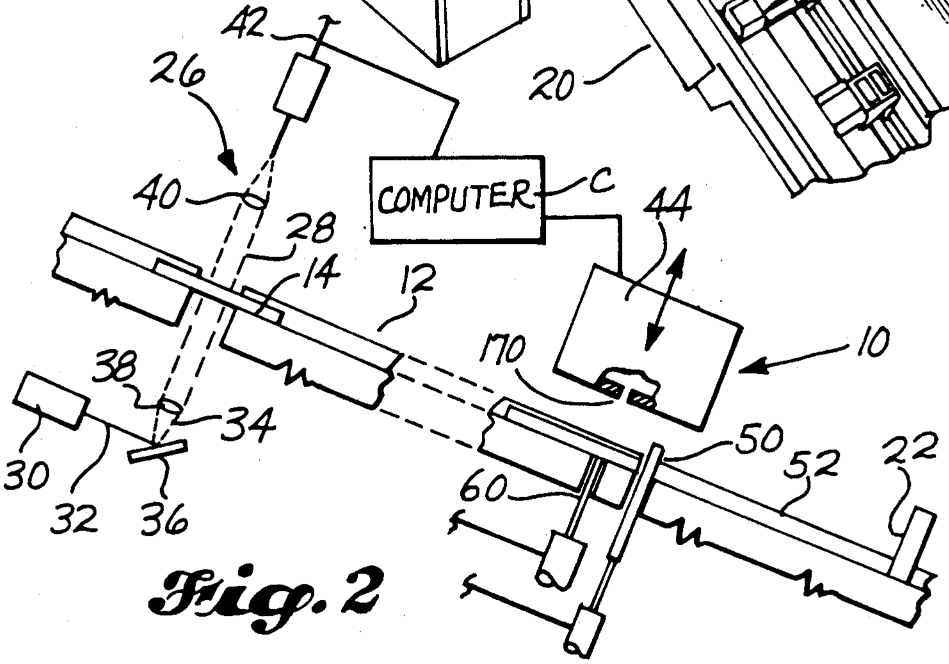
FIG. 2 is a fragmentary schematic view of the system of the invention.

FIGS. 1 and 2 show a material composition analyzer 10 positioned above a portion of a gravity type conveyor 12. Conveyor 12 is a part of a system for automatically sorting drill bits 14. FIG. 1 shows the analyzer 10 positioned immediately following a rotatable section 16 of the conveyor 12. Section 16 includes a portion 18 of conveyor 12 which is reversible end-to-end, for reversing the end-to-end positioning of the drill bits 14 on the conveyor 12. A description of the mechanism 16, and its use in a system for sorting drill bits, is described in the aforementioned applications Ser. Nos. 07/270,129 and 07/270,251.

In FIG. 1, the analyzer 10 is shown to be positioned on the conveyor 12 immediately forwardly of a ready gate 22. Gate 22 is positioned immediately forwardly of a mechanism 24 which determines the geometric characteristics of the drill bits 14. The mechanism 24 is described in detail in the aforementioned copending applications 07/270,221 and 07/270,129.

Referring to FIG. 2, the analyzer 10 is shown positioned on the conveyor 12 following an optical micrometer 26, or an equivalent device, which identifies basic geometric characteristics of the drill bit 14. As disclosed in copending application 07/270,251, the optical micrometer 26 provides a scanner beam 28 which extends across the slideway 12. By way of typical and therefore nonlimited example, the optical micrometer 26 may be of a type manufactured by Techmet Company of 6060 Executive Boulevard, Dayton, Ohio 45424, and sold under the name LASERMIKE TM. This particular optical micrometer 26 includes a low power helium-neon laser 30 which provides a very narrow and parallel laser beam 32, approximately 0.25 mm (0.01 inches) diameter. This beam 32 is converted into a radially scanned beam 34 by motor-driven multi-sided rotated mirror 36. The radially scanned beam 34 is converted into a parallel scanning beam 28 by means of a scan lens set 38, 40 oriented such that its focal point coincides with the center of the rotating motor-driven mirror 36.

The lens set 38, 40 is designed so that the parallel scanning beam 28 sweeps across the working area of the instrument 26. This scanning beam 28 provides a basis for making a no-contact measurement of articles (e.g. drill bits) as the articles move through it. In FIG. 2, a drill bit 14 is shown in the process of moving through the scanning beam 28 as it slides down the slideway 12. A drill bit 14 (or other article) is placed in the working area of the scanning beam 28 for a period of time proportional to the object profile along the scanned path. The interrupted beam is focused onto a sensor by the receiving lens 40 which converts the collected light to a time dependent signal. This time dependent signal is sent via a connection 42 to a computer C. The purpose of the optical micrometer 26 in the portion of the system that is illustrated by FIG. 2 is to identify enough of the shape of the drill bit 14 to determine (1) which end of the drill bit 14 is leading and which is trailing, (2) the presence of multiple drill bits and drill bits outside of certain diameter and/or length limits, and (3) whether or not a given drill bit 14 needs to be analyzed by the analyzer 10. This information developed is delivered to the computer C via the connection 42 and used to control subsequent handling of the drill bit 14.

The sorting of the drill bits 14 is for the most part based on geometric differences. However, the system may also need to distinguish between two types of drill bits which have the same geometric dimensions but differ as to the materials from which they are made. Specifically, the mix of drill bits to be sorted may include drills which are of the same length and/or diameter, but differ in hardness due to a difference in their metallurigical makeup. The analyzer 10 determines whether a given drill bit 14 contains cobalt in the alloy. The optical micrometer 26 determines, from the geometric characteristics of the drill bits 14, which need to be further analyzed by the analyzer 10. When such a drill bit 14 is identified by computer analysis of data from optical micrometer 26, the computer C in turn puts the analyzer 10 into operation. The material composition analyzer 10 is basically characterized by an instrument 44, a support frame 46, an actuator 48 for raising and lowering the instrument 44 relative to the gravity conveyor 12, and a stop gate 50. The gravity conveyor 12 includes a slideway 52. As shown by FIGS. 3, 4 and 10–14, in the region of the analyzer 10, the slideway 52 may be in the form of a groove 54 defined by side members 56, 58 and a center member 60.

Figure 3:
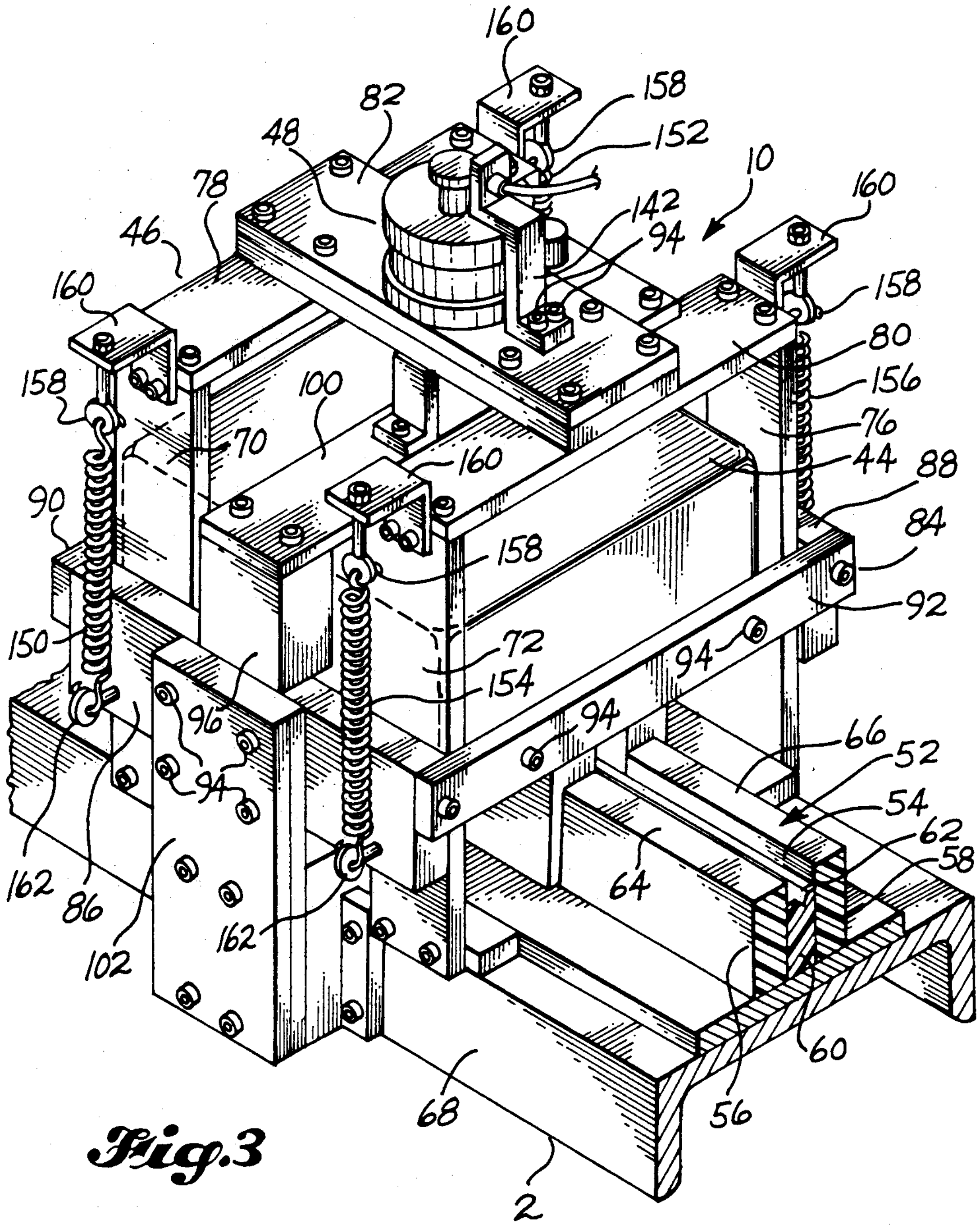
FIG. 3 is an isometric view taken from above and looking towards one side and one end of the composition identifying mechanism.
Figure 4:
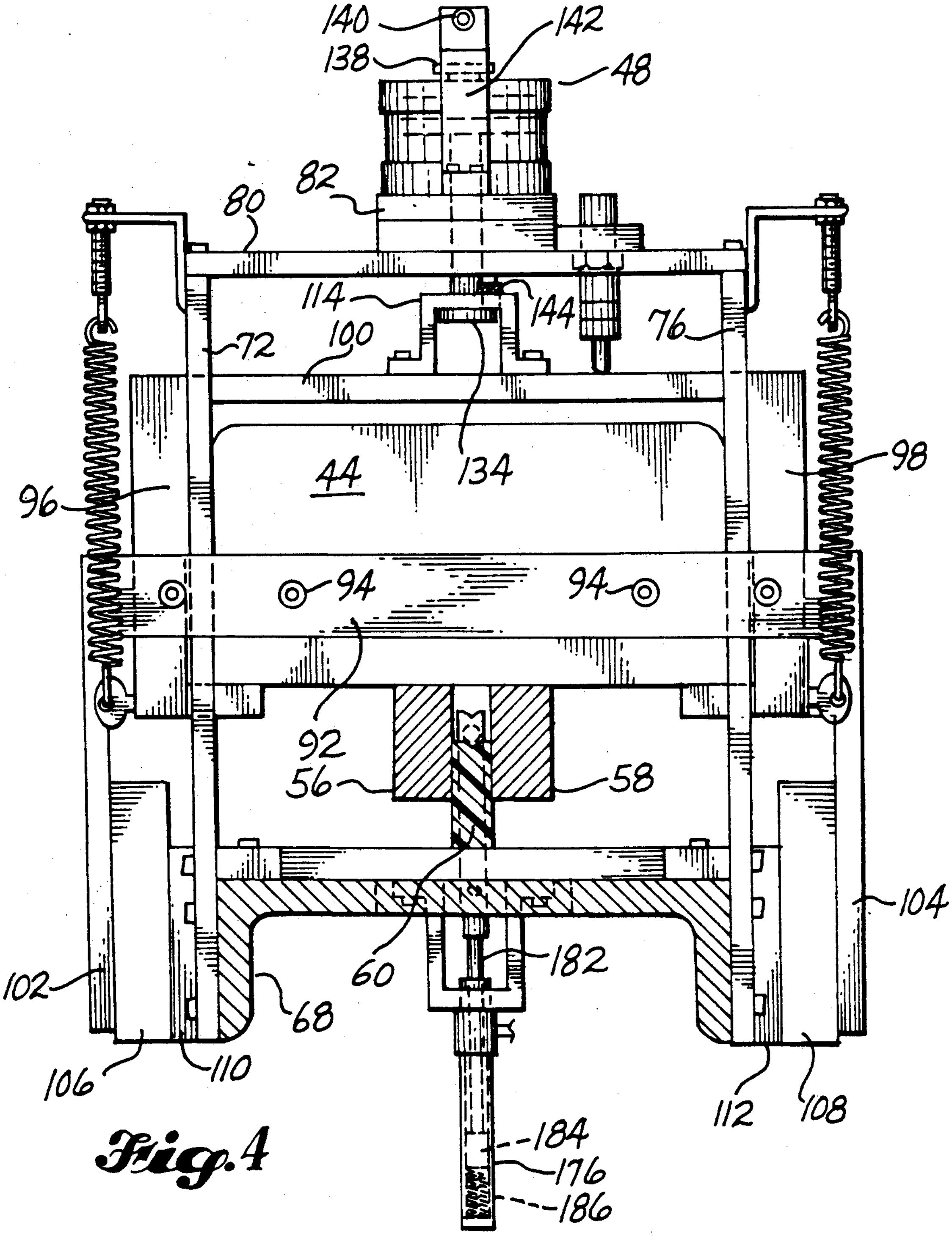
FIG. 4 is a transverse sectional view taken substantially along line 4—4 of FIG. 5, and showing a substantial portion of the composition identifying mechanism in end elevation.
Figure 5:
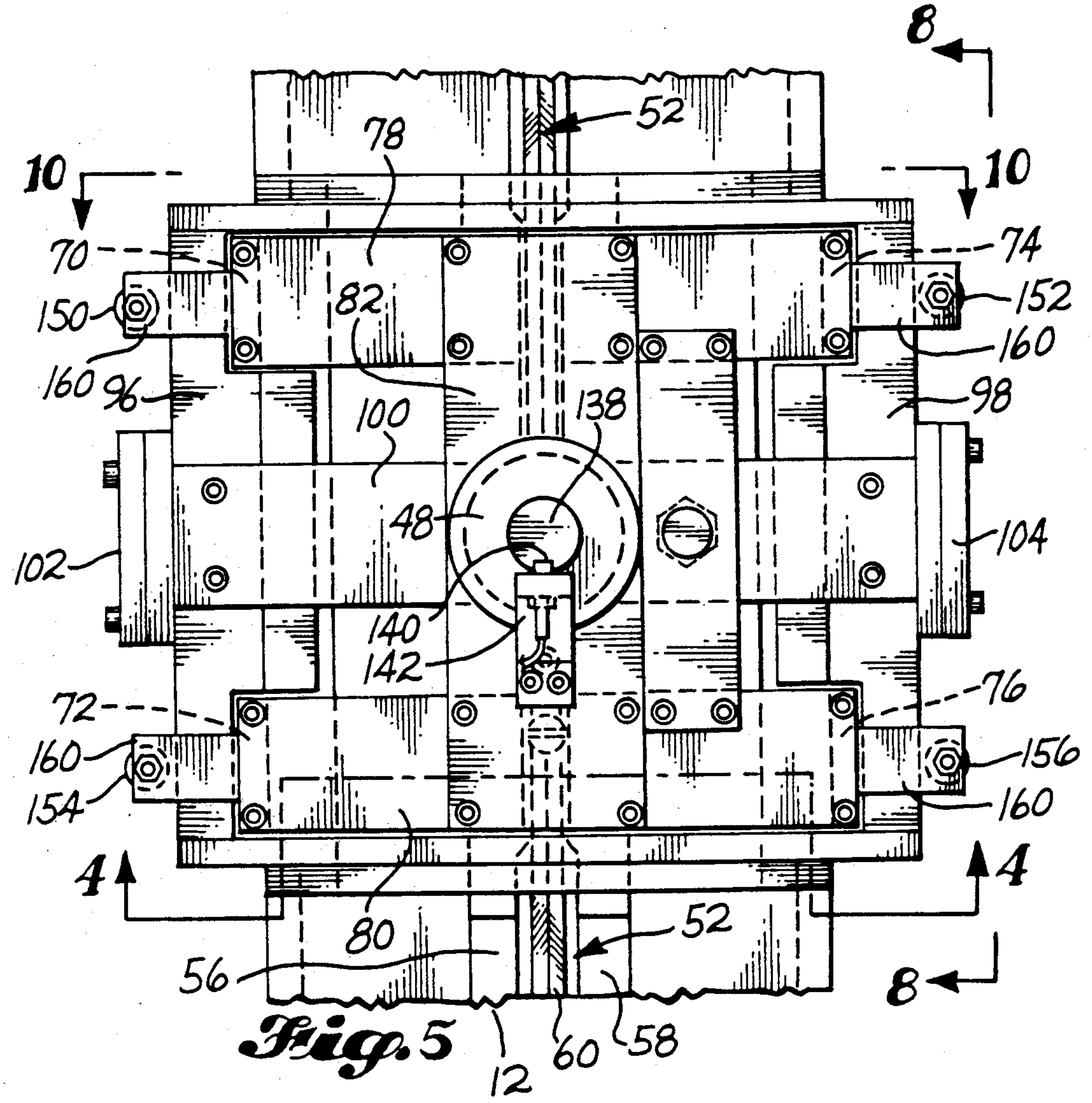
FIG. 5 is a top plan view of the composition identifying mechanism.
Figure 6:
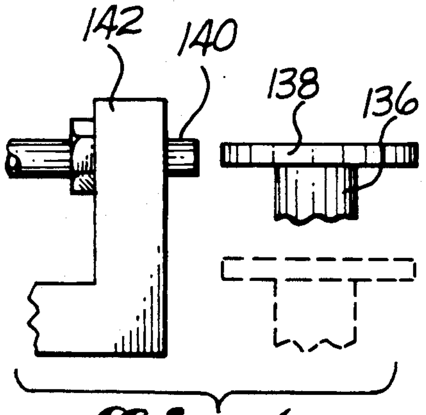
FIG. 6 is an enlarged scale fragmentary view of a position sensor mounted on top of the composition identifying mechanism.
Figure 7:
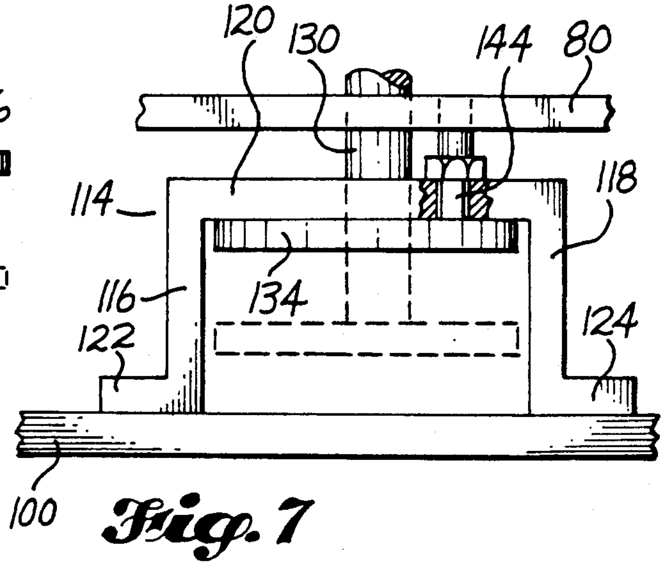
FIG. 7 is an enlarged scale fragmentary view of a lifting handle on top of the instrument housing and the lower portion of a lifting cylinder.
Figure 8:
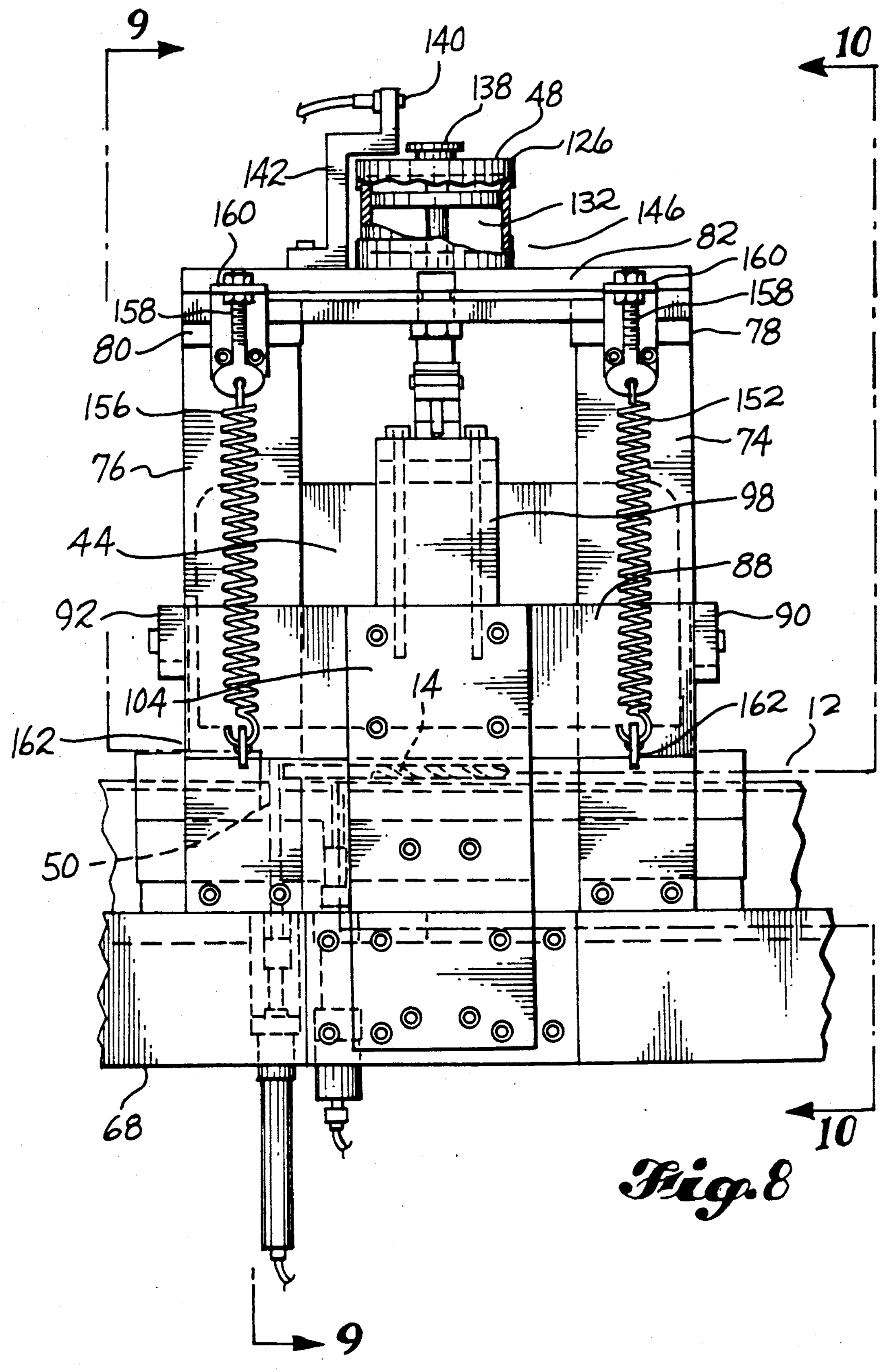
FIG. 8 is a fragmentary side view taken substantially along the aspect of line 8—8 of FIG. 5.
Figure 9:
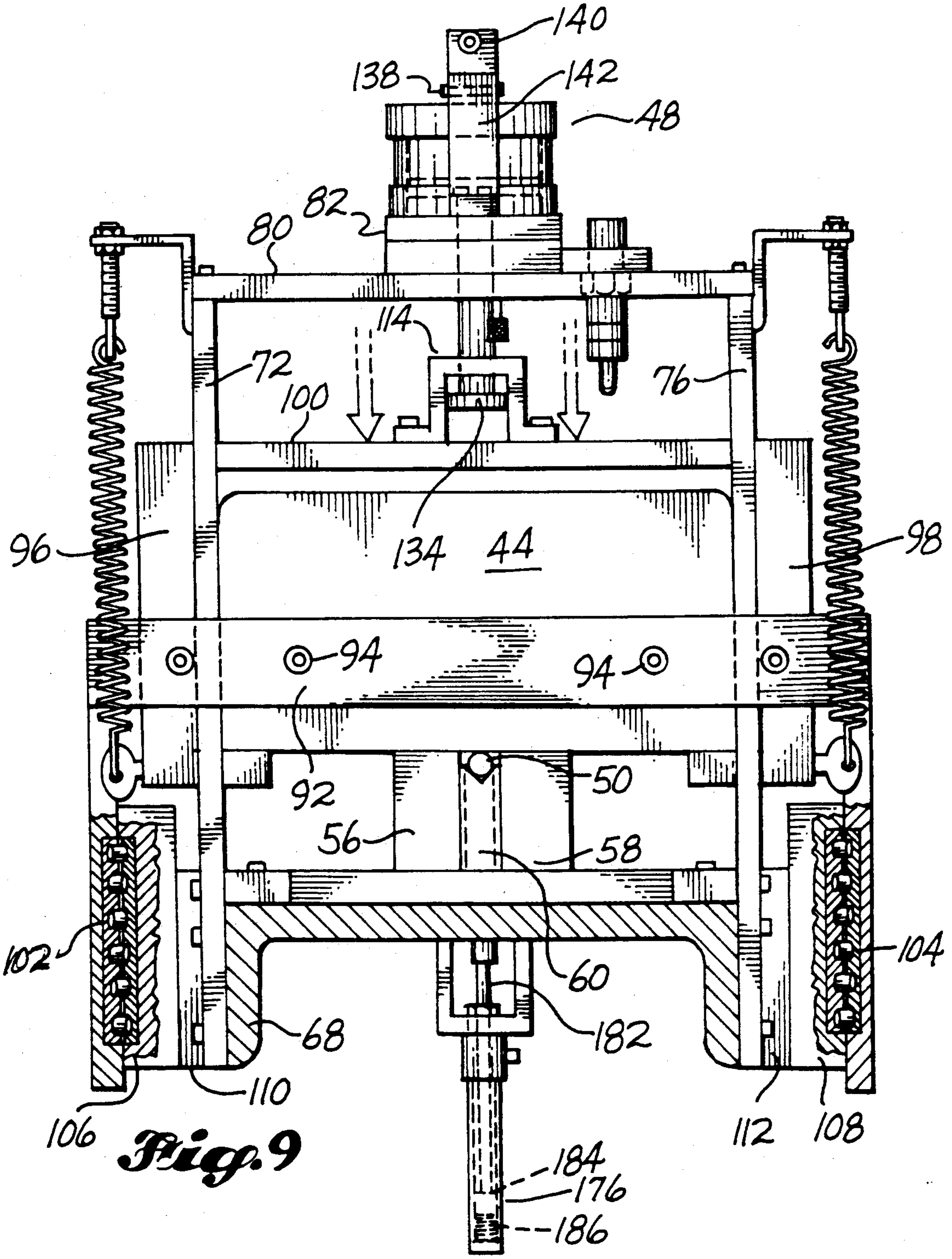
FIG. 9 is a fragmentary side view taken substantially along the aspect of line 8—8 of FIG. 5.
Figure 10:
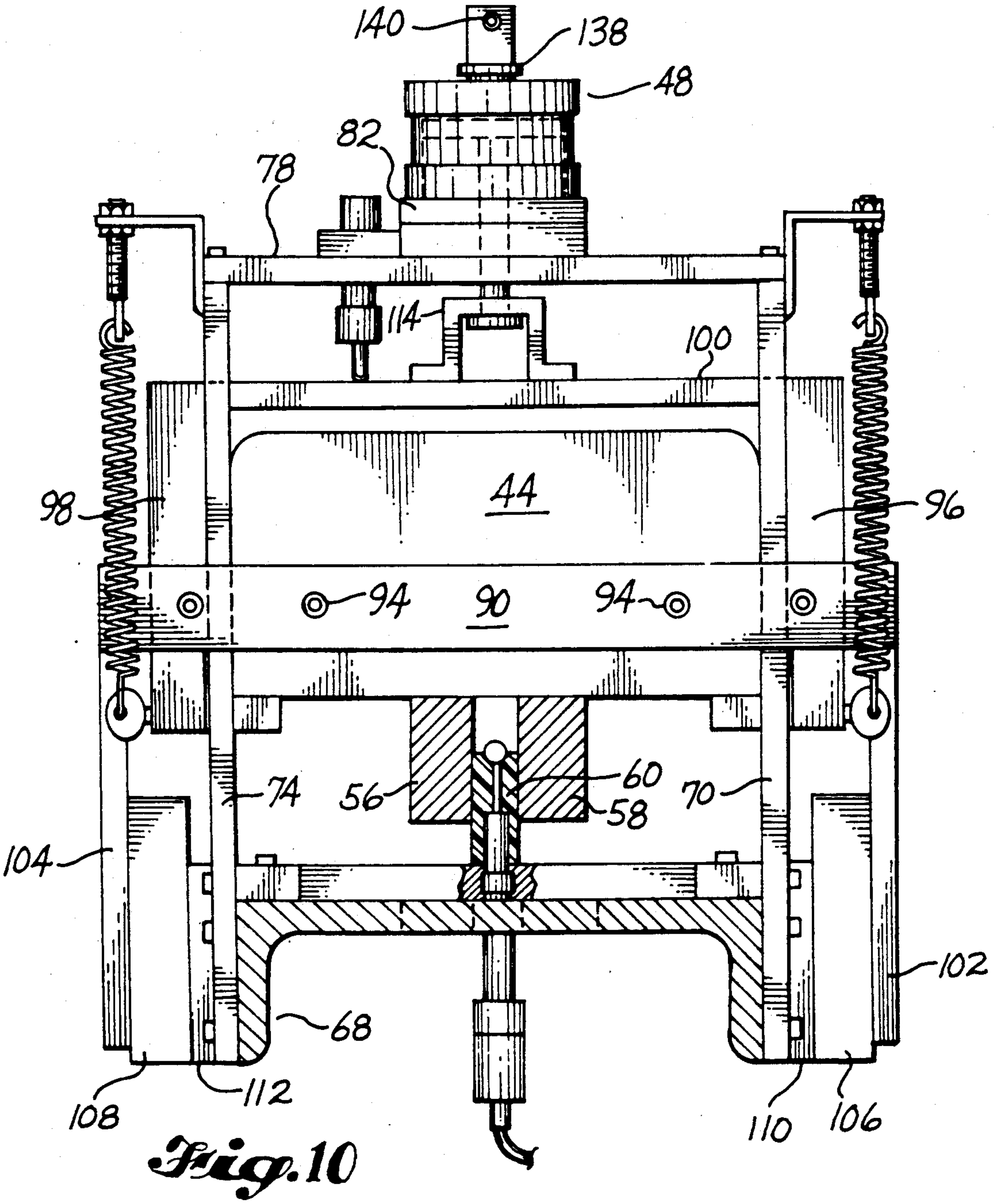
FIG. 10 is a view like FIG. 4.

The gravity conveyor 12 includes a slideway 52. As shown by FIG. 3, downstream of the analyzer 10, the slideway 52 may be in the form of a groove 54 defined by side members 56, 58 and a center member 60. All three members 56, 58, 60 are constructed from a self-lubricated plastic. The upper surface 62 of member 60 is offset below the upper surfaces 64, 66 of the members 56, 58 and may be provided with a V-groove, as illustrated. The slideway defining members 56, 58, 60 are mounted onto a frame structure which may include a metal channel 68, as shown. In the vicinity of the analyzer 10, the member 60 is outwardly bound by a pair of aluminum shielding walls 57, 59. These walls are attached to the instrument 44, as shown by FIG. 4. The shielding function of these walls 57, 59 is hereinafter described.

The frame 46 is shown to comprise four corner posts 70, 72, 74, 76. The posts may be in the form of aluminum bars which are attached at their lower ends to side portions of the slide conveyor 12. The upper ends of posts 70, 74 are connected together by a cross frame member 78. In identical fashion, the upper ends of posts 72, 76 are connected together by a cross frame member 80. A perpendicular frame member 82 may extend between central portions of the cross frame members 78, 80. In the illustrated embodiment, the cross frame members 78, 80 are aluminum bars constructed from the same material as posts 70, 72, 74, 76. The perpendicular frame 82 is shown constructed from two thicknesses of a slightly wider aluminum bar material.

The instrument 44 comes with a housing which is supported by a carrier 84. Carrier 84 comprises opposite side members 86, 88 which extend perpendicular to the posts 70, 72, 74, 76. Member 86 is outwardly adjacent the posts 70, 72. Member 88 is outwardly adjacent the posts 74, 76. Lateral frame members 90, 92 interconnect the ends of the members 86, 88. Specifically, frame member 90 extends laterally of the slide conveyor 12 adjacent the outer edges of posts 70, 74. Member 60 is connected to the upstream ends of members 86, 82. Frame member 92 extends laterally of the gravity conveyor 12 adjacent the outer edges of the posts 72, 76. Member 92 is connected to the leading ends of the members 86, 88. Cap screws 94, or the like, extend through the frame members 90, 92, into the housing for the instrument 44, to in that manner secure the instrument 44 to the carrier 84. The carrier 84 includes side posts 96, 98 which at their lower ends are connected to central portions of the side member 86, 88. The upper ends of the posts 96, 98 are connected to opposite ends of a cross head 100 which extends between and parallel to the cross frame members 78, 80. A movement guiding mechanism is provided on each side of the carrier 84. By way of typical and therefore nonlimitive example, it may comprise a pair of depending members 102, 104 which at their upper ends are connected to central portions of the side members 86, 88, such as by use of cap screws 94. The lower end portions of the members 102, 104 are connected to outer races 106, 108 of a pair of slide bearing assemblies. The slide bearing assemblies include races 110, 112 which are secured to frame member 68. A plurality of rollers are positioned between races 106 and 110 and between races 108 and 112, to form what is known as cross roller slides. The cross roller slides provide an accurate low friction guide for the carrier 84 and the instrument 44 carried by it. The cross roller slides function to accurately guide the instrument 44 up and down, i.e. prevent instrument 44 from cocking in position as it moves up and down.

As shown by FIGS. 4, 7, 9 and 10, a yoke 114 is connected to the central portion of the cross head 100. Yoke 114 includes upstanding side arms 116, 118 which are interconnected at their upper ends by a cross arm 120. Flanges 122, 124 are provided at the lower ends of the arms 116, 118 and are connected to the cross head member 100.

The actuator 48 may be a fluid cylinder comprising a cylinder housing 126 which is mounted on frame member 48. A piston head 128 is located within the housing 126. A piston rod 130 depends from the head 128 and extends through an opening provided in a lower wall portion of the housing 128 and then through an opening provided in the frame member 48. A fluid chamber 132 is defined below the piston head 128, between it and the lower wall of the housing 128. A fluid, such as compressed air, is delivered into chamber 132 for moving the piston 128, 130 upwardly, and is exhausted from the chamber 132 to allow a downward movement of the piston 128, 130 by gravity, as will hereinafter be described in more detail. Piston rod 130 extends downwardly through an opening in arm 120 and at its lower end is connected to a disk 134. A second rod 136 extends upwardly from the piston head 128, through an opening in the upper end of housing 126 and at its upper end is connected to a disk 138. As illustrated, rods 130, 136 are coaxial.

A proximity sensor 140 is located above frame member 48. Specifically, it is mounted on the upper end of a supporting bracket 142. The lower end of the supporting bracket 142 is connected to the frame member 48, such as by means of cap screws 94. A second proximity sensor 144 is mounted on the top arm 120. An opening is provided in the top arm 120 and the sensor 144 extends vertically downwardly through the opening and has a lower end which is substantially flush with the lower surface of arm 120.

Disk 138 moves vertically with respect to sensor 140 and disk 134 moves vertically with respect to sensor 144, during operation of the actuator 48. When the actuator 48 is in its up position, the instrument 44 is in an up position spaced above the slideway 52. When the actuator 48 is in its down position, the instrument 44 is in a down position contiguous the slideway 52. When the actuator 48 and the instrument 44 are in their up position, the disk 138 is adjacent the sensor 140 and the sensor 140 functions to send a signal to the computer C informing it that the instrument is in a raised position. The instrument 44 and its carrier 84 are moved downwardly by gravity. This movement is accomplished by a venting of fluid out from the fluid chamber 132 via fluid passageway 146. As should be apparent from FIGS. 4, 7, 9 and 10, the weight of the instrument 44 and the carrier 82 wants to pull the yoke 114 downwardly. The top arm 120 of yoke 114 rests on the disk 134 and applies the downward force onto disk 134 and hence to the piston rod 130. The weight or gravity forces want to pull the piston rod 130 downwardly. It is moved upwardly, or is supported in an up position by fluid within the chamber 132. Exhausting of fluid from the chamber 132 results in the instrument 44, the carrier 84, piston rods 130, 136, and disks 134, 138 all moving downwardly.

In use, the instrument 44 is lowered into contact with a drill bit 14. Instrument 44 includes a lower wall in which a slot or window is formed through which x-ray energy is transmitted from within the instrument 44. Preferably, a soft plastic surface material is provided on the bottom wall of the instrument housing where contact is made with the drill bit 14. Also, in preferred form, counterweight springs are provided. In the illustrated embodiment, these are shown in the form of four coil springs 150, 152, 154, 156. The upper ends of the springs 150, 152, 154, 156 are connected to anchor members 158 which are identical and each is connected to a support bracket 160. The lower ends of the springs 150, 152, 154, 156 are connected to members 162 which are identical and which are connected to end portions of the carrier frame members 86, 88, as illustrated. The springs 150, 152, 154, 156 are tension springs. They are partially relaxed when the carrier 84 and the instrument 44 are in a raised position. A lowering of the carrier 84 and instrument 44 stretches the springs 150, 152, 154, 156 and in this manner, the weight of the instrument-carrier assembly 44, 84 is in effect reduced as it is lowered. This enables the assembly 44, 84 to be lowered into contact with a drill bit, without any damage occurring at either the lower wall of the housing 44 or within the slideway 52.

In FIGS. 11–17, the x-ray window or slot is designated 170. This slot or window may measure about 1/10th of one inch wide by about one inch long. It is positioned so that when the instrument 44 is lowered (FIG. 16), the slot or window 170 is in register with a central portion of the drill bit shank 14.

The shields 57, 59 are connected to a lower portion of the instrument housing and project or depend downwardly from it into positions on opposite sides of the slideway, as shown by FIGS. 11–14. Preferably, the shields 57, 59 each are of a length substantially equalling the dimension of the instrument housing in the direction of drill bit movement along the slideway 52. It was found that the shields 57, 59 could be constructed from aluminum bar material.

The stop gate 50 extends through a stop gate avenue in the slideway 52, disposed substantially perpendicular to the slideway 52. The stop gate may be raised and lowered by an air cylinder 176 positioned below the frame member 68. As shown by FIGS. 11–14, a supporting yoke 178 may be provided with flanges at the upper ends of side arm portions of the yoke being secured to the member 68. The open end of an air cylinder housing may be secured to the closed end 180 of the yoke 178. A piston rod 182 extends from a piston head 184 within the cylinder housing and at its upper end is connected to the lower end of the stop gate 50. Preferably, a coil spring 184 is provided in the cylinder housing below the piston 184. The coil spring 186 pushes upwardly against the piston head 184, to normally bias the stop gate 50 into an up position. A combined inlet-outlet passageway 188 is provided at the upper end of the cylinder housing. Compressed air is introduced into passageway 188 above the piston head 184, to move the stop gate 50 downwardly. When air is exhausted from the chamber above the piston head 184, out through the passageway 188, the coil spring 186 serves to move the stop gate 50 up into an operative position.

Figure 11:
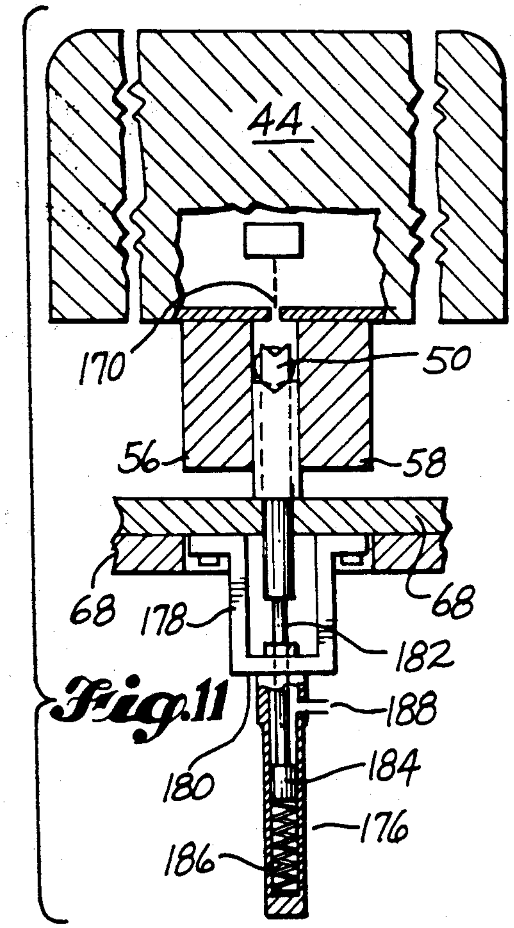
FIG. 11 is a fragmentary sectional view taken substantially along line 11,12—11,12 of FIG. 8, showing the instrument housing and the stop gate both in a raised position.
Figure 12:
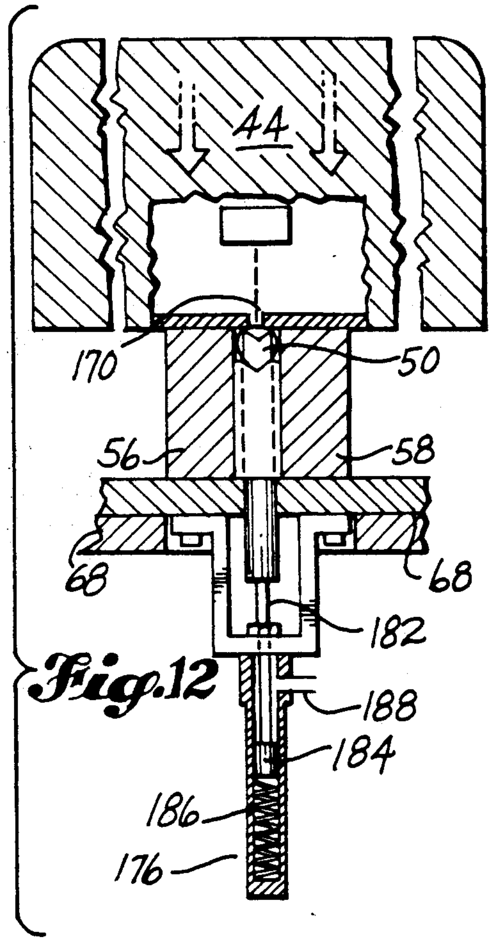
FIG. 12 is a view like FIG. 11, but showing the instrument housing in a down position.
Figure 13:
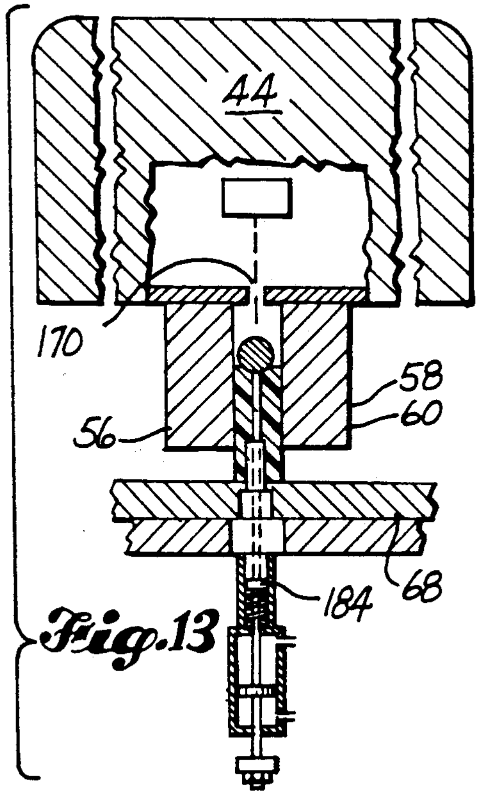
FIG. 13 is a fragmentary sectional view taken substantially along line 13,14—13,14 of FIG. 8, showing the instrument housing in an up position and the impetus pin in a down position.
Figure 14:
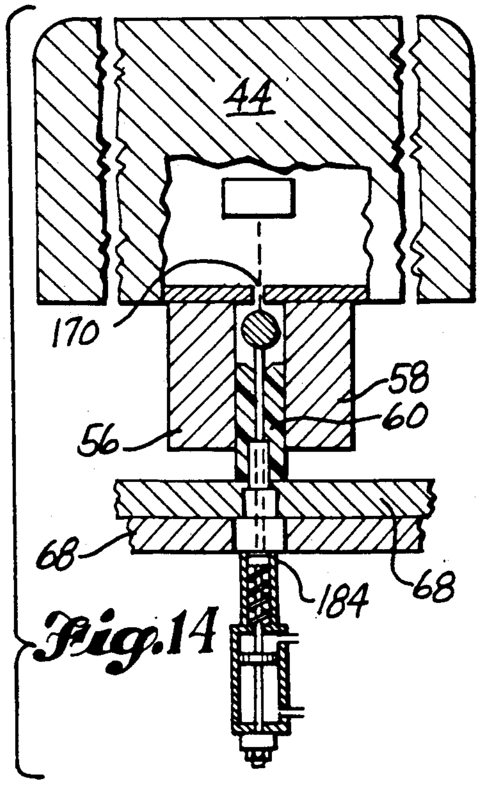
FIG. 14 is a view like FIG. 13, but showing the impetus pin in an up position.
Figure 15:
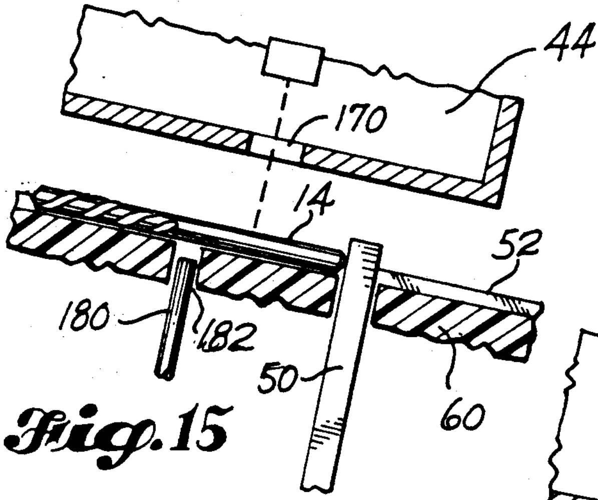
FIG. 15 is a fragmentary side elevational view in the region of the stop gate and the impetus pin, showing the stop gate up, an article against the stop gate, and showing the impetus pin down and the instrument housing up.
Figure 16:
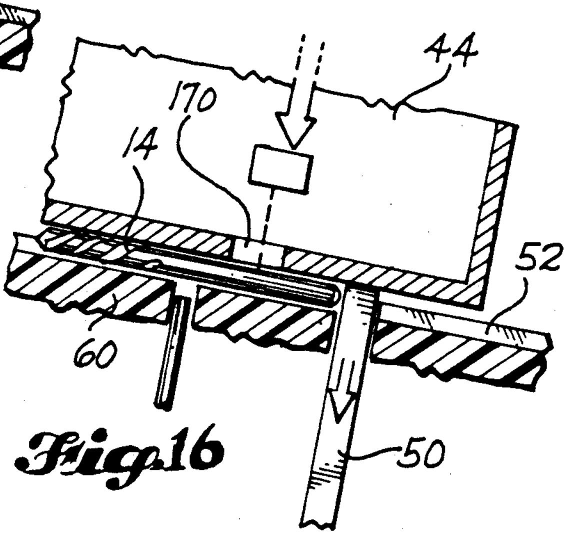
FIG. 16 is a view like FIG. 19, but showing the instrument housing in a down position.
Figure 17:
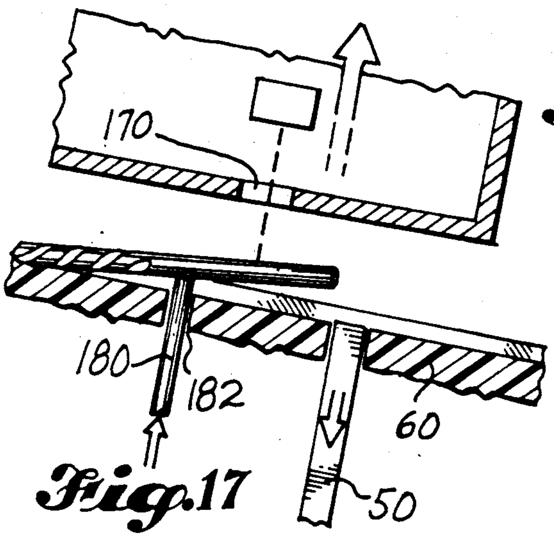
FIG. 17 is a view like FIGS. 15 and 16, but showing the instrument housing raised, the stop gate lowered and the impetus pin raised to stimulate movement of the article.

FIG. 11 shows the instrument 44 in a raised position and the stop gate 50 in an up position 50, with a drill bit in contact with the stop gate 50. FIG. 15 shows the side view of this same condition. Following contact of a drill bit 14 with the stop gate 50, the instrument 44 is lowered into contact with the drill bit 14. This may involve the lower wall of the instrument housing contacting the upper end of the stop gate 50 and moving it downwardly, as necessary, so that the stop gate will not prevent contact between the lower wall of the instrument housing and the drill bit 14. Such downward movement of the stop gate 50 is permitted because its upward movement is caused by the spring 184.

Referring back to FIG. 2, data from the optical micrometer 26 informs the controlling computer C when a particular drill bit 14 which has passed through the beam 28 needs to be analyzed by the analyzer 10, so as to determine whether it is a high speed drill or a cobalt steel drill. There is stored information in the computer to the effect that there are certain drill bit sizes which have to be distinguished as to high speed or cobalt steel so that they can be routed to the proper storage bin. The upper sensor elements 138, 140 operate to inform the computer when the instrument 44 is in a raised position. When the computer receives the right combination of signals, it controls the release of compressed air from stop gate cylinder 176, allowing the spring 186 to move the stop gate upwardly into a drill bit stopping position.

Thereafter, the drill bit 14 which needs to be analyzed slides down the slideway 52 into contact with the stop gate 50. Then, the fluid is exhausted out from chamber 132 of actuator 48, allowing a gravity descent of the instrument 44. The instrument 44 moves downwardly until its lower wall (or a pad on its lower wall) is in contact with the drill bit 14 and then the instrument stops. However, the piston, the piston rod 130, and disk 134 continue to move downwardly, with the disk 134 moving away from the proximity sensor 144. The relative movement between disk 134 and the proximity sensor 144 sends a signal to the computer C letting it know that the instrument is in contact with the drill bit 14.

The x-ray generator within the instrument 44 is always on. However, when the sensor components 134, 144 signal that the instrument 44 is in contact with the drill bit 14, the information gathering portion of the instrument 44 starts to function and continues to function for a predetermined interval of time. A material identifying signal is generated and sent to the computer C for later use with other identifying data to control the routing of the particular drill bit 14 that has been analyzed onto and into a dedicated storage bin.

After a given drill bit 14 has been analyzed, the computer C causes fluid to be introduced into actuator chamber 132, to raise the instrument 44. It also causes the introduction of fluid into the cylinder 176 for lowering the stop gate 50.

It has been found that sometimes a drill bit 14 which has been stopped by the stop gate 50 will remain at rest on the slideway 52 after the stop gate 50 has been retracted. Accordingly, the system is provided with a dislodge pin 180. A dislodge pin avenue 182 is formed in the base of the slideway 52, above the stop gate 50. The lower end of the dislodge pin 180 is connected to a piston 184. Piston 184 and dislodge pin 180 are normally in a down position, either because of gravity forces or by the use of a spring positioned to bias them downwardly. The dislodge pin 180 is operated by the delivery of compressed air below the piston 184, quickly followed by an exhausting of the compressed air. This results in a quick up and down movement of the dislodge pin 180. The dislodge pin 180, as it moves upwardly, strikes the drill bit 14 and imparts to it a movement starting force.

Figure 18:
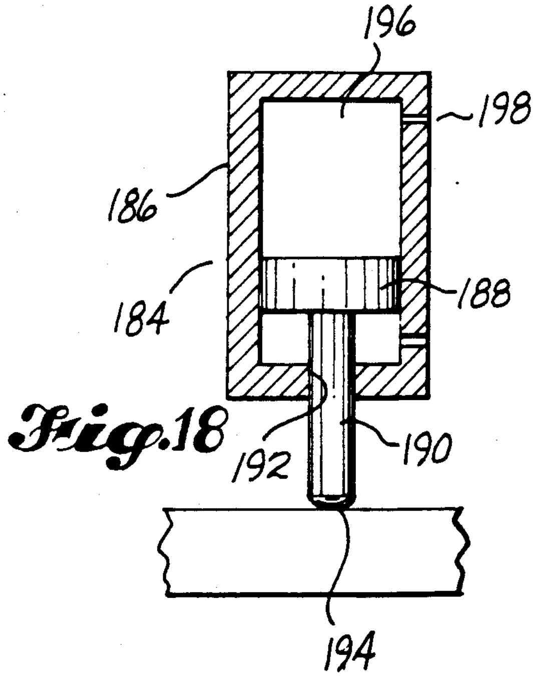
FIG. 18 is an enlarged scale fragmentary sectional view of a dash pot mounted on top of the composition identifying mechanism.

Preferably, an energy absorbing device 184 is provided to cushion the upward movement of the instrument 44. In FIG. 18, this device 184 is shown in the form of a dash pot comprising a housing 186 which is affixed to the instrument frame 46. A piston head 188 is provided within housing 186. A piston rod 190 extends downwardly from the piston head 188 through an opening 192 in the lower end of the housing 186. The lower end 194 of the piston rod 190 contacts the upper member 100 of the carrier 84. Fluid is contained within chamber 196 above the piston head 188. The fluid can escape from chamber 196 through one or more control orifices 198. The rate of fluid escape is limited by the size of the orifice(s) (S) 198. The simple dash pot 184 that has been illustrated can be replaced by any one of a number of energy absorbing devices which are available, including devices which utilize springs to absorb energy, hydraulic devices which operate to move fluid from one side of the piston head to the other, and devices known as linear decelerators.

By way of example, the instrument for analyzing the material composition of the drill bits may be an x-ray fluorescence analyzer of the type marketed by ASOMA Instruments of 12212-H Technology Boulevard, Austin, Tex., U.S.A. 78727. This analyzer operates to irradiate the article being analyzed with a low level radioisotope source. This radiation is directed through the slot or window 170. The radiation excites the elements in the drill bit 14 causing them to fluoresce, i.e., give off their own characteristic x-rays. The energy of these characteristic x-rays identifies the element (e.g. cobalt) and the intensity is a measure of the element's concentration in the article. The typical analysis time of an x-ray fluorescense analyzer is 10–100ths seconds per article.

As stated above, the system and method of this invention were developed for the purpose of helping to identify drill bits so that such identification could be used for controlling the routing of the drill bits to dedicated storage bins. Also, the material composition analyzing function has been described as being usable in conjunction with other instruments which determine the physical characteristics of the same articles. Again, this combination has utility in systems for automated sorting of drill bits wherein the drill bits will include plural species of drill bits which have identical physical characteristics but differ as to the metallurgical makeup of the material from which they are manufactured. However, it is to be understood that the material analyzing system and method of this invention may have use for rapidly analyzing the material composition of articles other than drill bits, including where the material composition alone is of interest, i.e., there is no need to identify the articles as to their geometric characteristics.

The specific equipment that has been illustrated, and the specific steps and sequence of steps which have been described, are presented for purposes of example only, so that from them the basic aspects of the invention can be understood. The scope of protection is not to be determined by such examples or specific details but rather by the claims which follow, interpreted in accordance with the established rules of patent claim interpretation, including application of the doctrine of equivalents.

What is claimed is:

1. A composition identifying mechanism, comprising:

a gravity conveyor including a slideway along which articles slide;

a stop gate movable between a stop position in which said stop gate blocks travel of an article along the slideway and a retracted position in which the stop gate is clear of the slideway, allowing the article to slide along the slideway;

an instrument including a housing and means within the housing for generating an identifying signal based on the presence or absence of a particular material in an article;

means mounting said instrument above the slideway adjacent the stop gate, for movement of the instrument between a position contiguous the slideway and a position spaced from the slideway; and wherein when an article is against the stop gate and the instrument is contiguous the slideway, the means for generating an identifying signal is in an operative relationship with the article.

2. A mechanism according to claim 1 wherein the slideway, whereat it confronts said instrument, comprises a base portion and opposite sidewall portions together defining a slideway groove in which the articles slide, said base portion including a stop gate avenue extending substantially perpendicular to the slideway and said stop gate being located in said stop gate avenue.

3. A mechanism according to claim 2 wherein the base of the slideway further comprises an avenue for a dislodging pin, and said mechanism includes a dislodging pin in said avenue which is extendible from said avenue for imparting a movement starting force to an article on the slideway, and is retractable back into the avenue.

4. A mechanism according to claim 3, wherein the dislodging pin avenue and the dislodging pin are located upwardly on the gravity conveyor from the stop gate and stop gate avenue.

5. A mechanism according to claim 1, wherein the instrument is an x-ray fluorescence analyzer 6. A mechanism according to claim 5, wherein the slideway, whereat it confronts said instrument, comprises a base portion and opposite sidewall portions together defining a slideway groove in which the articles slide, said base portion including a stop gate avenue extending substantially perpendicular to the slideway and said stop gate being located in said stop gate avenue.

7. A mechanism according to claim 6, wherein said instrument housing includes a wall portion confronting the slideway groove, and side shields extending from said wall into positions outwardly adjacent the sidewalls of the slideway.

8. A mechanism according to claim 1, wherein said means mounting comprises a support frame for said instrument on said gravity conveyor including a support frame member spaced above the slideway, said instrument being positioned between said support frame member and said slideway, a linear actuator on said support frame member connected to the instrument housing and operable to move said instrument between a position contiguous the slideway and a position spaced from the slideway.

9. A mechanism according to claim 8, including a support frame for the slideway, and wherein said support frame for the instrument comprises column means connected to and extending upwardly from the support means for the slideway, and said mechanism comprises a carrier for the instrument which engages the column means and is guided by the column means in a path of travel towards and away from the slideway, said instrument housing being connected to the carrier and said linear actuator being connected to the carrier.

10. A mechanism according to claim 8, wherein the instrument is an x-ray flourescence analyzer 11. A mechanism according to claim 10, wherein the slideway, whereat it confronts said instrument, comprises a base portion and opposite sidewall portions together defining a slideway groove in which the articles slide, said base portion including a stop gate avenue extending substantially perpendicular to the slideway and said stop gate being located in said stop gate avenue.

12. A mechanism according to claim 11, wherein said instrument housing includes a wall portion confronting the slideway groove, and side shields for shielding x-rays extending from said wall portion into positions outwardly adjacent the sidewalls of the slideway.

13. A method of identifying the presence or absence of a particular material in a quantity of articles, comprising:

- conveying the articles in single file along a conveyor path;
- momentarily stopping movement of each article when it reaches a predetermined station on said path;
- at said station positioning an instrument contiguous each stopped article, said instrument including means to analyze the article as to the presence or absence in it of a particular substance;
- operating the instrument to determine the presence or absence of the substance in the stopped article;
- retracting the instrument from the stopped article; and
- resuming movement of the article along the conveyor path.

14. The method of claim 13, wherein the conveyor is a sloping slideway, and comprising stopping an article on the slideway at said station, by moving a stop member into the path of the article on said slideway, to arrest its sliding movement.

15. The method of claim 14, comprising moving the stop member into an article movement stopping position by extending it upwardly through an opening in the slideway.

16. A method according to claim 13, wherein the instrument is an x-ray fluroescence analyzer and when operated to identify the presence or absence of a substance, irradiates an article being analyzed with a low level radioisotope source, to excite the elements of the article causing them to give off their own characteristic x-rays, and further comprising analyzing the energy of the characteristic x-rays to determine the presence or absence of the substance in the article.

* * * * *